US009224070B1

(12) United States Patent
Sundareswara et al.

(10) Patent No.: US 9,224,070 B1
(45) Date of Patent: Dec. 29, 2015

(54) SYSTEM FOR THREE-DIMENSIONAL OBJECT RECOGNITION AND FOREGROUND EXTRACTION

(71) Applicant: HRL Laboratories, LLC, Malibu, CA (US)

(72) Inventors: Rashmi. N Sundareswara, Los Angeles, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/290,921

(22) Filed: May 29, 2014

Related U.S. Application Data

(62) Division of application No. 13/282,389, filed on Oct. 26, 2011, now Pat. No. 8,774,504.

(51) Int. Cl.
*G06K 9/62* (2006.01)
*G06K 9/34* (2006.01)
*G06K 9/46* (2006.01)
*G06K 9/66* (2006.01)

(52) U.S. Cl.
CPC ............. *G06K 9/6267* (2013.01); *G06K 9/342* (2013.01); *G06K 9/4652* (2013.01); *G06K 9/66* (2013.01)

(58) Field of Classification Search
CPC ......... G06K 9/34; G06K 9/62; G06K 9/6267; G06K 9/00201; G06K 9/4652; G06K 9/4671; G06N 3/08; G06N 3/02; G06T 2207/20081; G06T 2207/20144; G06T 2207/20164; G06T 7/0081
See application file for complete search history.

(56) References Cited

U.S. PATENT DOCUMENTS

| 5,570,430 | A  | * | 10/1996 | Sheehan et al. | 382/128 |
| 5,838,816 | A  | * | 11/1998 | Holmberg | 382/157 |
| 2005/0212820 | A1 | * | 9/2005 | Liu et al. | 345/620 |
| 2006/0285755 | A1 | * | 12/2006 | Hager et al. | 382/224 |
| 2007/0041638 | A1 | * | 2/2007 | Liu et al. | 382/170 |
| 2008/0170787 | A1 | * | 7/2008 | Cheng et al. | 382/180 |
| 2010/0189354 | A1 | * | 7/2010 | de Campos et al. | 382/190 |
| 2010/0312730 | A1 | * | 12/2010 | Weng et al. | 706/15 |
| 2011/0216965 | A1 | * | 9/2011 | Rother et al. | 382/159 |
| 2012/0218427 | A1 | * | 8/2012 | Wu | 348/208.6 |

OTHER PUBLICATIONS

Office Action No. 1, for U.S. Appl. No. 13/282,389, mailed on Nov. 12, 2013.
Response to Office Action No. 1, for U.S. Appl. No. 13/282,389, filed Feb. 12, 2014.

(Continued)

*Primary Examiner* — Jingge Wu
(74) *Attorney, Agent, or Firm* — Tope-McKay & Associates

(57) ABSTRACT

The present invention describes a system for recognizing objects from color images by detecting features of interest, classifying them according to previous objects' features that the system has been trained on, and finally drawing a boundary around them to separate each object from others in the image. Furthermore, local feature detection algorithms are applied to color images, outliers are removed, and resulting feature descriptors are clustered to achieve effective object recognition. Additionally, the present invention describes a system for extracting foreground objects and the correct rejection of the background from an image of a scene. Importantly, the present invention allows for changes to the camera viewpoint or lighting between training and test time. The system uses a supervised-learning algorithm and produces blobs of foreground objects that a recognition algorithm can then use for object detection/recognition.

5 Claims, 15 Drawing Sheets

(56) References Cited

OTHER PUBLICATIONS

Bay, Tuyletaars and Gool, Luv Van, SURF: Speeded-Up Robust Features: ECCV, 2006.
Chien, S.Y., et al., "Efficient Moving Object Segmentation Algorithm Using Background Segmentation Technique," IEEE Transactions on Circuits for Video Technology, vol. 12, No. 7, Jul. 2002.
Comaniciu, Dorin and Meer, Peter, Meanshift: A Robust Approach towards Feature Space Analysis, IEEE Transactions on Pattern Analysis and Machine Intelligence, vol. 24, No. 5, May 2002.
Lowe, David (2004). Distinctive Image Features from Scale-Invariant Keypoints. International Journal of Computer Vision, (60), 2004, 91-110.
Hess R., "An Open-Source SIFT Library," ACM MM, 2010.
Jarvis, R.A. et al., "Clustering using a Similarity Measure based on Shared Nearest Neighbors," IEEE Transactions on Computers, vol. c-22, No. 11, Nov. 1973.
O'Rourke, J., "Computational Geometry in C" Cambridge University Press, 1998 p. 73-101.

\* cited by examiner

Image 1

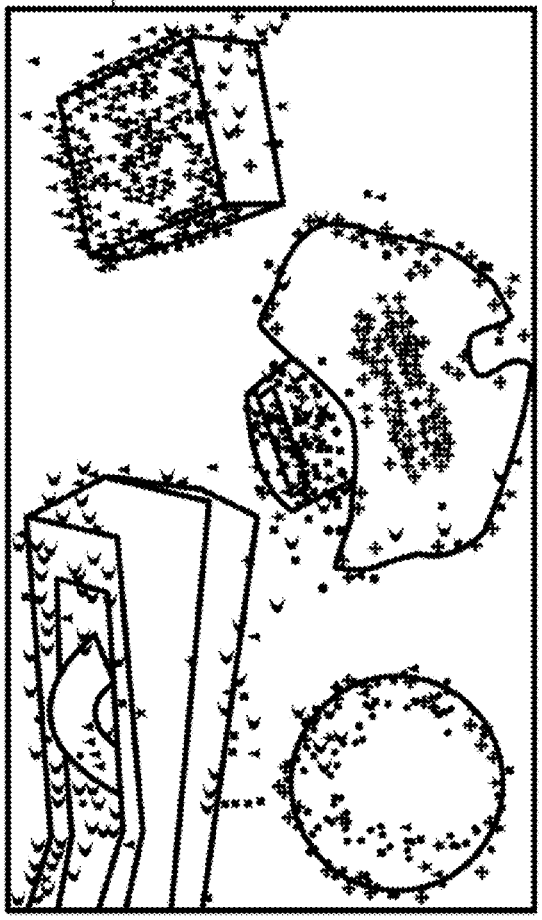
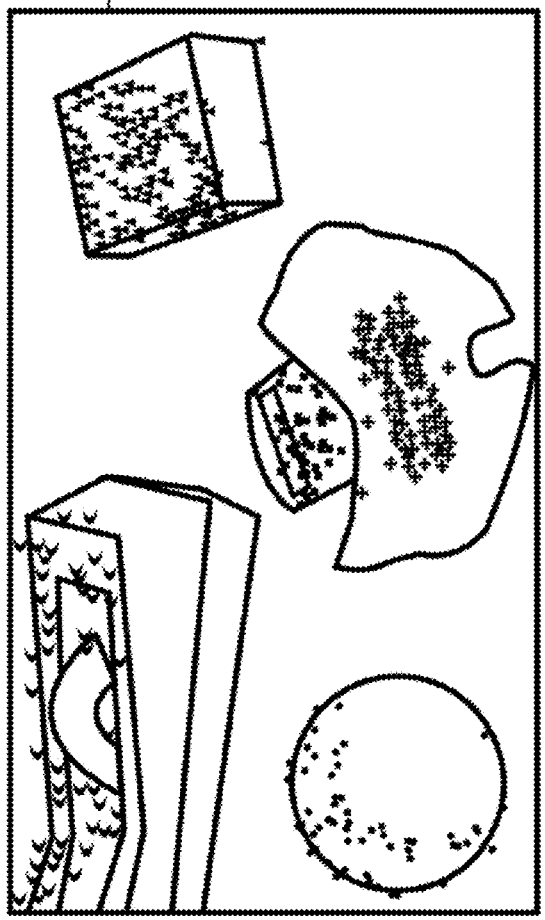
FIG. 6B
Image 2

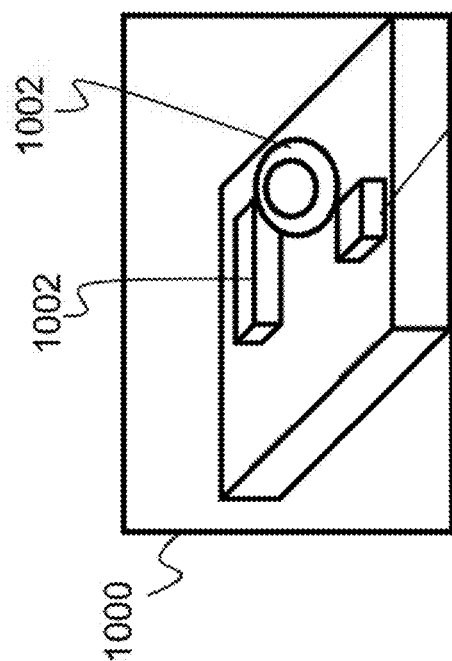
FIG. 10A
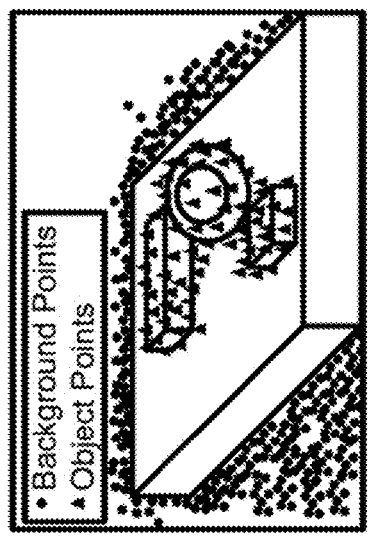
FIG. 10B
FIG. 10C
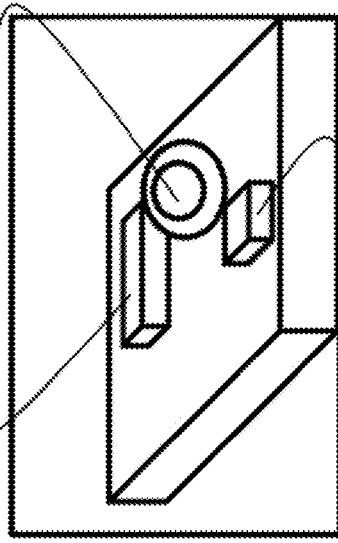
FIG. 10D

SYSTEM FOR THREE-DIMENSIONAL OBJECT RECOGNITION AND FOREGROUND EXTRACTION

CROSS-REFERENCE TO RELATED APPLICATIONS

This is a Divisional application of U.S. Non-Provisional application Ser. No. 13/282,389, filed on Oct. 26, 2011, entitled, "System for Three-Dimensional Object Recognition and Foreground Extraction."

BACKGROUND OF THE INVENTION (1) Field of Invention

The present invention relates to a system for three-dimensional object recognition and foreground extraction and, more particularly, to a system for three-dimensional object recognition using an appearance-based model and foreground extraction through segmentation, nearest neighbor and clustering approaches.

(2) Description of Related Art

Prior art exists which describes recognition of three-dimensional objects in two-dimensional images. However, current prior art has been unable to recognize and segment objects in a multi-object scene setting in a reliable manner. One of the primary reasons that algorithms have failed is because of the requirement of accurate object-pose classification that a segmentation code demands.

Segmentation refers to the process of partitioning an image into multiple segments. Image segmentation is typically used to locate objects and boundaries in images. Segmentation algorithms in the prior art compute a transformation from features matched from a specific training pose to features matched in the test pose. However, due to lack of population of features matched to any specific training pose or ambiguous matches in the case of feature-less objects, the algorithm fails in many cases. Since the recognition depended on the segmentation, recognition also failed.

Additionally, prior art in the field involves using local feature algorithms on monochrome images, followed by classification of each feature (also referred to as "keypoint") detected to a previously trained object's pose, and computing a transform from the matched pose features to the current features to transform a trained object's pose boundary to the current detected object. The prior art contains several disadvantages. First, local feature algorithms are described for monochrome images. However, how to proceed with these algorithms in color images is not clear. Literature exists for combining all three channels by appending the three feature descriptors to make one descriptor. However, this makes the dimensionality of the feature descriptor, which is already quite large, even larger, thus making it sensitive to distortions. Second, a scene with multiple objects, known and unknown, presents many challenges. The presence of incorrectly classified keypoints on the boundary of the objects makes the recognition and, consequently, the segmentation algorithm fail. Third, the segmentation algorithms in prior art require reliable feature matches to one training object's pose in order to segment the objects in the current object. However, when there are an inadequate number of features detected or features from training and test are incorrectly matched (especially in the case of the presence of ambiguous matches in the case of texture-less objects), the segmentation fails.

Thus, a continuing need exists for a system for three-dimensional object recognition in color images which does not increase the dimensionality of the feature descriptor, thereby keeping the computation efficient in spite of the increase in information about the image.

The present invention is also directed to the field of foreground extraction. Prior art exists which describes methods of removing background and extracting foreground objects from images. Two well-known methods include stationary background/camera and feature detection algorithms. In the case of a stationary camera, one can use a background mask. Background masking works well only in the case where the camera is expected to be in the same location and orientation (i.e., viewpoint angle) throughout the period that the computer vision algorithm is used. This is inconvenient because many times a user expects to change the location of the camera for various reasons or have a robot move the camera around. Additionally, the orientation of the camera might be changed by accident. All of these actions will then render the background mask ineffective. Background subtraction is effective if the computer vision algorithm is expecting the foreground objects to move and the background to stay still as described by Chien et al in "Efficient Moving Object Segmentation Algorithm Using Background Segmentation Technique," in IEEE Transactions on Circuits for Video Technology, Vol. 12, No. 7, July 2002. Prior techniques will also fail if the lighting changes between frames.

Furthermore, one could use features detected using a feature detection algorithm like SIFT (Scale Invariant Feature Transforms) as described by Lowe in "Distinctive Image Features from Scale-Invariant Keypoints" in International Journal of Computer Vision (60), 2004, 91-110 (hereinafter referred to as the Lowe reference) and SURF (Speeded-Up Robust Features) as described by Bay et al. in "SURF: Speeded-Up Robust Features" in European Conference on Computer Vision (ECCC), 2006 (hereinafter referred to as the Bay reference) to eliminate features that might belong to the background. However, this leaves behind fairly pixelated regions of the background that are not well segmented. The Lowe reference and the Bay reference are hereby incorporated by reference as though fully set forth herein.

Most computer vision applications that need background removal have the camera fixed in the same position, such as a surveillance camera, for example. Having the camera in a fixed location and orientation speeds up the computation time as the algorithms can be trained on how the foreground objects appear in that particular viewpoint. Moreover, these methods will not work if the lighting changes from a previous frame.

Thus, a continuing need exists for a method for extraction of foreground objects and the correct rejection of background from an image of a scene despite changes in lighting or camera viewpoint.

SUMMARY OF THE INVENTION

The present invention relates to a system for three-dimensional object recognition using an appearance-based model and foreground extraction through segmentation and nearest neighbor approaches. The system comprises one or more processors and a memory having instructions such that when the instructions are executed, the one or more processors perform operations of receiving a color image, then separating the color image into monochrome color channels. A set of features is detected in each of the three monochrome color channels, and the set of features is combined for each of the three monochrome color channels to yield a combined feature descriptor describing a set of features in the color image. Each detected feature is assigned a class corresponding to its closest matching object in a learned feature database, and multiple features are assigned a same class. The set of features contains one or more outlier features which are assigned to an incorrect class, and wherein the set of features for each monochrome color channel is described by a feature descriptor for that channel. The outlier features are removed from the set of features in the color image, and features of the same class are clustered into clusters within the set of features. Finally, a boundary is drawn around each cluster to create a bound cluster representing a recognized object, whereby objects are recognized in the color image.

In another aspect, the monochrome color channels comprise a red channel, a green channel, and a blue channel.

In another aspect, the set of features is detected using a local feature detection algorithm, wherein the local feature algorithm is selected from a group consisting of Scale Invariant Feature Transform (SIFT) and Speeded-Up Robust Features (SURF).

In another aspect, the system is further configured to perform an operation of combining the feature descriptors for each of the three monochrome color channels according to the following:

$$fd = \left(\frac{\|fd_{red}\|}{\|fd_{red}\| + \|fd_{green}\| + \|fd_{blue}\|}\right) fd_{red} +$$

$$\left(\frac{\|fd_{green}\|}{\|fd_{red}\| + \|fd_{green}\| + \|fd_{blue}\|}\right) fd_{green} +$$

$$\left(\frac{\|fd_{blue}\|}{\|fd_{red}\| + \|fd_{green}\| + \|fd_{blue}\|}\right) fd_{blue}$$

where:
fd is the combined feature descriptor for the color image;
$fd_{red}$ is the feature descriptor for the red color channel;
$fd_{green}$ is the feature descriptor for the green color channel;
$fd_{blue}$ is the feature descriptor for the blue color channel; and
$\|x\|$ is the magnitude of x.

In another aspect, when removing outliers from the set of features in the color image, the system is further configured to perform operations of for each feature: creating two lists of an operator-specified number of the feature's nearest neighbors, where a first of the two lists contains nearest neighbors of the same class, and a second of the two lists contains nearest neighbors of a different class; and removing features if more than an operator-specified number of its closest neighbors from the first list are also members of the second list; and repeating the operations above for each removed feature with respect to features that were not removed.

In another aspect, the system is further configured to perform an operation of clustering groups of features of the same class using k-shared nearest neighbor.

In another aspect, the system is further configured to perform an operation of drawing a boundary around each cluster using the convex hull of the cluster.

The present invention also comprises one or more processors configured to perform operations of extracting a set of features from a set of foreground training images of foreground objects captured with a camera using a feature detection algorithm, resulting in a set of foreground features. An input image is received, and at least one region of interest is extracted from the input image, wherein the at least one region of interest represents a potential foreground object. The input image is segmented, resulting in a set of segments. The input image is then processed with a feature detection algorithm to detect a set of features, resulting in a set of detected features. Each feature in the set of detected features is assigned to a class, resulting in as set of assigned features. Each segment in the set of segments is classified as representing foreground or background based on the assigned features in each segment. Finally, the segments representing a foreground object in the input image are output.

In another aspect, the system is further configured to perform operations of collecting images representing background that are expected to be seen if the camera moves, resulting in a set of background training images. The background training images are then processed with a feature detection algorithm, resulting in a set of background features.

In another aspect, the system is further configured to perform an operation of masking any background regions from the set of training images such that only features representing foreground objects are extracted.

In another aspect, the system is further configured to perform an operation of eliminating any segments representing background in the input image.

In another aspect, the system is further configured to perform an operation of assigning the class of each feature in the set of detected features according to a class of its nearest neighbor in either the set of background features or the set of foreground features.

As can be appreciated by one in the art, the present invention also comprises a method for causing a processor to perform the operations described herein.

As can be appreciated by one in the art, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6B is an image illustrating outlier removal according to the present invention;

FIG. 10A is an image depicting a typical test scene image with objects according to the present invention;

FIG. 10B is an image illustrating a result of features detected and super-imposed on the segmented image according to the present invention;

FIG. 10C is an image illustrating a result of deleting segments that were considered the background according to the present invention;

FIG. 10D is an image illustrating a result of recognizing foreground objects according to the present invention;

DETAILED DESCRIPTION

Figure 1:
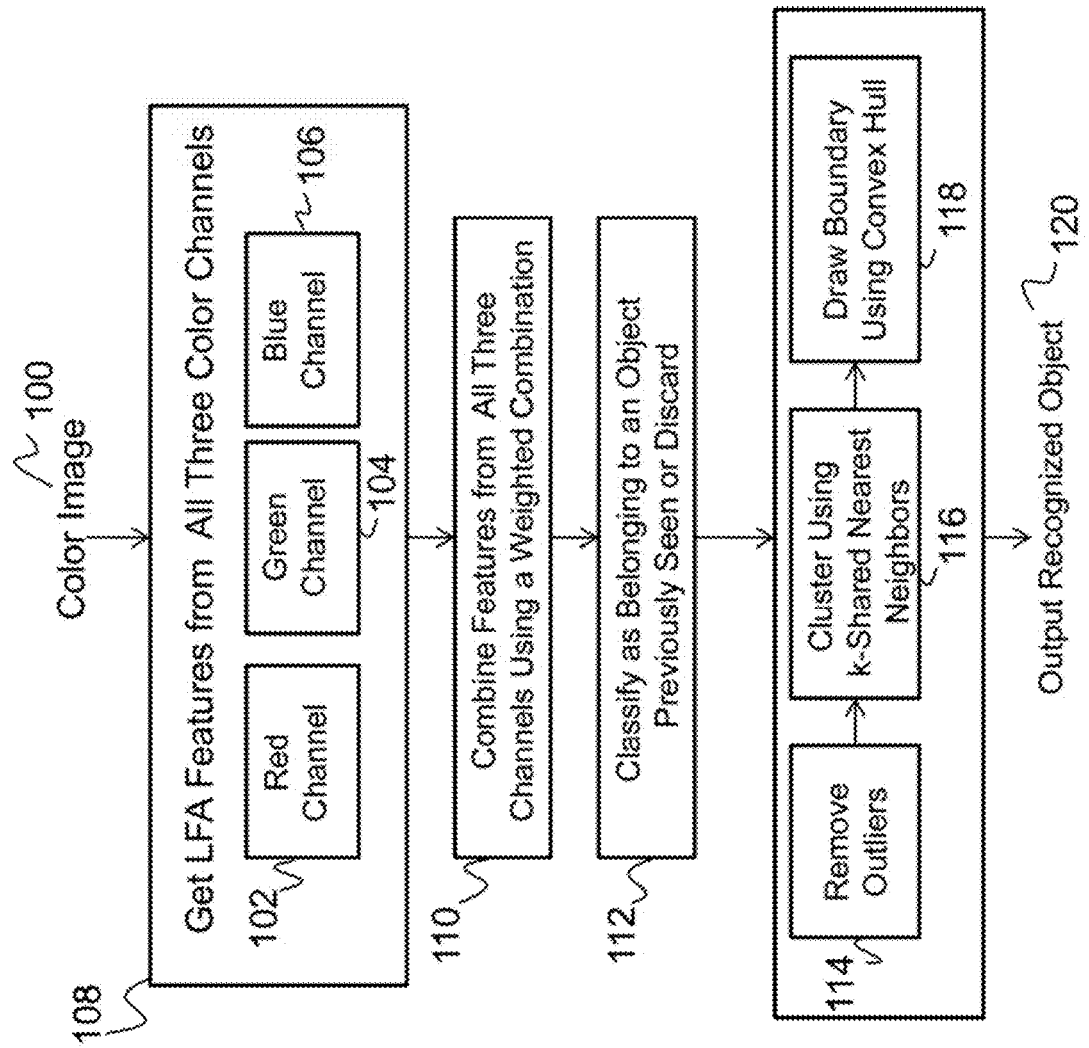
FIG. 1 is a flow diagram depicting a system for three-dimensional object recognition according to the present invention.

The present invention relates to a system for three-dimensional object recognition and foreground extraction and, more particularly, to a system for three-dimensional object recognition using an appearance-based model and foreground extraction through segmentation, nearest neighbor and clustering approaches. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction.

Instead, they are used to reflect relative locations and/or directions between various portions of an object. As such, as the present invention is changed, the above labels may change their orientation.

(1) Principal Aspects

The present invention has three "principal" aspects. The first is a system for three-dimensional object recognition and foreground extraction. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for three-dimensional object recognition and foreground extraction, typically in the form of software, operated using a data processing system (computer or computer network). The third principal aspect is a computer program product. The computer program product generally represents computer-readable instruction means stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive.

(2) Specific Details (2.1) Robust Three-Dimensional Object Recognition Using an Appearance Based Model The present invention describes a system for recognizing three-dimensional objects with six degrees of freedom recognition (i.e., the object to be recognized can be rotated (three parameters) and translated (three parameters) for a total of six parameters in three dimensions) from color images by detecting features of interest, classifying them according to previous objects' features that the algorithm has been trained on, and finally drawing a boundary around them to separate each object from others in the image. Unique aspects of the present invention include the application of local feature-detection algorithms (LFA) to color images, removal of outliers, clustering of resulting feature descriptors, and the drawing of a boundary (a convex hull) around each recognized object in the scene. Non-limiting examples of LFAs include SURF (speeded-up robust features) as described by the Bay reference, and SIFT (Scale Invariant Feature Transforms) as described by the Lowe reference. Furthermore, the present invention can be easily extended to being online (i.e., new objects to be recognized can be introduced and trained at any time).

The invention described herein recognizes three-dimensional objects from two-dimensional images under any condition of three-dimensional rotation and translation and has knowledge of the objects' locations and poses. Additionally, the present invention is able to find more invariant features in a color image reliably (than would be possible if the LFA was only working with monochrome images), remove outliers from specific positions in the image that correspond to a object, cluster the features, recognize the object, and then draw a boundary around them. These capabilities are vital for a robot arm, for instance, which intends to locate, recognize, grasp, and manipulate an object.

FIG. 1 is a flow diagram of a method for three-dimensional object recognition according to the present invention. First, a color image 100 is received. The color image 100 is then separated into three monochrome color channels. For example, the three monochrome color channels include a red channel 102, a green channel 104, and a blue channel 106. Next, a set of features is detected in each of the three monochrome color channels by applying LFAs to the color image 100 (get LFA features from all three color channels 108). The features are combined for each of the three monochrome color channels using a weighted combination 110 to yield a combined feature descriptor describing a set of features in the color image 100. Each detected feature is assigned a class corresponding to its closest matching object in a learned feature database, where multiple features may be assigned a same class, where the set of features may contain one or more outlier features which are assigned to an incorrect class, and where the set of features for each monochrome color channel are described by a feature descriptor for that channel. In other words, each detected feature is classified as belonging to an object previously seen (learned) or discarded 112. The outlier features are then removed 114 from the set of features in the color image 100. Next, groups of features of the same class are clustered into clusters within the set of features. As a non-limiting example, the group of features is clustered using a k-shared nearest neighbors algorithm 116. Finally, a boundary is drawn around each cluster to create a bound cluster representing a recognized object, whereby objects are recognized in the color image. For example, the boundary is drawn using a convex hull 118 around the inliers (i.e., features that are not removed during removal of the outliers). The recognized object is then output 120.

A first part of the present invention is directed to applying LFAs to color images. As mentioned above, the present invention utilizes LFAs to detect features of interest in an image. A common feature of most LFAs is the computation of a histogram of intensity information from local image gradients that have been determined to be scale-space and orientation invariant. However, prior LFAs are defined mainly for monochrome images.

The present invention describes the application of LFAs to color images. First, let $fd=x_1, x_2, \ldots x_n$ be a feature descriptor in $\Re_n$, where $\Re_n$ is a set of features in a color image. Then, fd is computed for red ($fd_{red}$), green ($fd_{green}$), and blue ($fd_{blue}$) channels separately, resulting in a feature descriptor for each color channel. The three feature descriptors are combined as a weighted average, where the weights are the magnitude of each feature descriptor as set forth below:

$$fd = \left(\frac{\|fd_{red}\|}{\|fd_{red}\| + \|fd_{green}\| + \|fd_{blue}\|}\right)fd_{red} +$$
$$\left(\frac{\|fd_{green}\|}{\|fd_{red}\| + \|fd_{green}\| + \|fd_{blue}\|}\right)fd_{green} +$$
$$\left(\frac{\|fd_{blue}\|}{\|fd_{red}\| + \|fd_{green}\| + \|fd_{blue}\|}\right)fd_{blue}$$

where fd is the combined feature descriptor for the color image;
$fd_{red}$ is the feature descriptor for the red color channel;
$fd_{green}$ is the feature descriptor for the green color channel;
$fd_{blue}$ is the feature descriptor for the blue color channel; and
$\|x\|$ is the magnitude of x.

Figure 2:
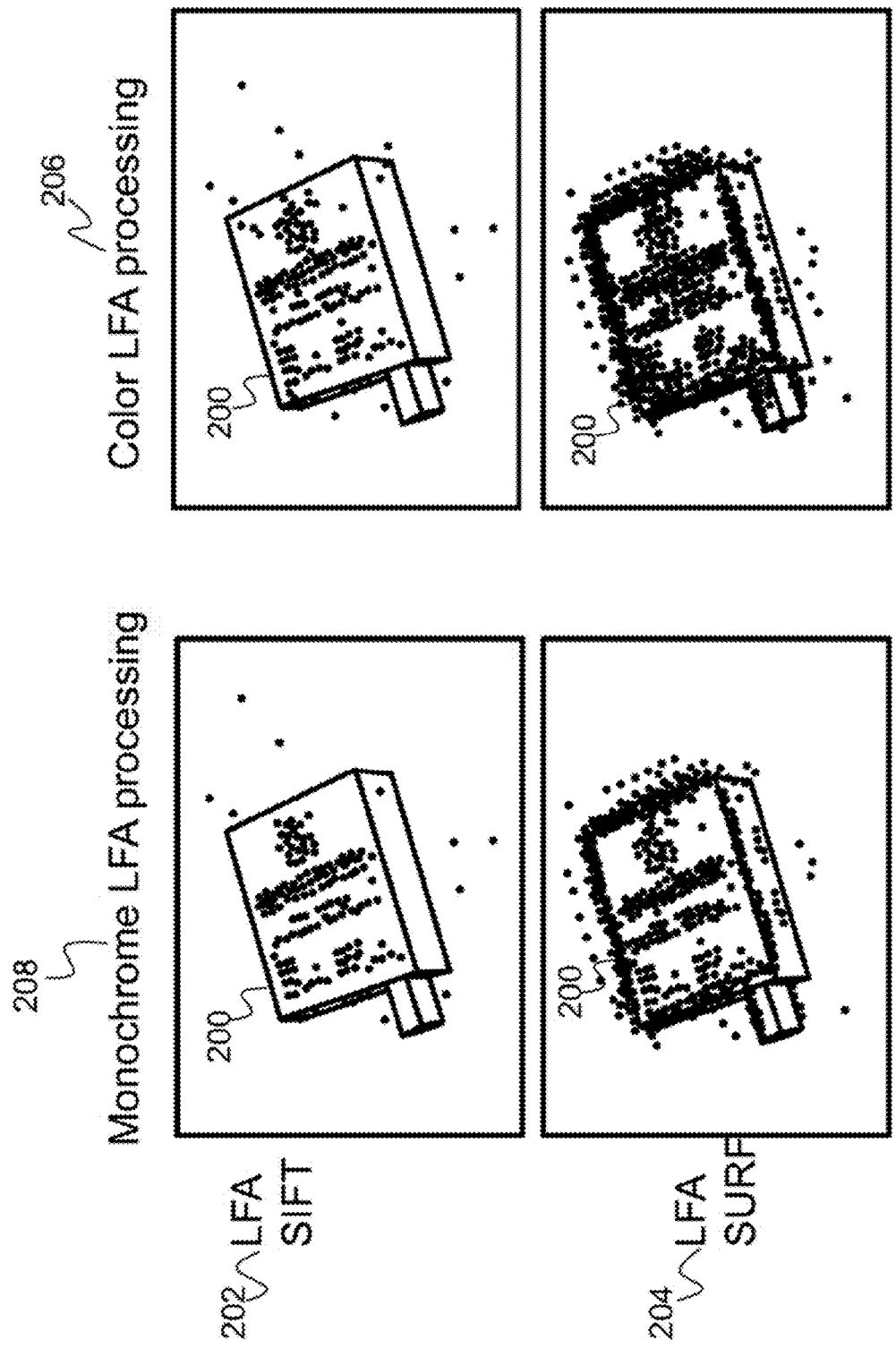
FIG. 2 is a set of images illustrating the difference in feature detection as a result of applying a local feature detection algorithm in color modes compared to a monochrome mode according to the present invention.
Figure 3:
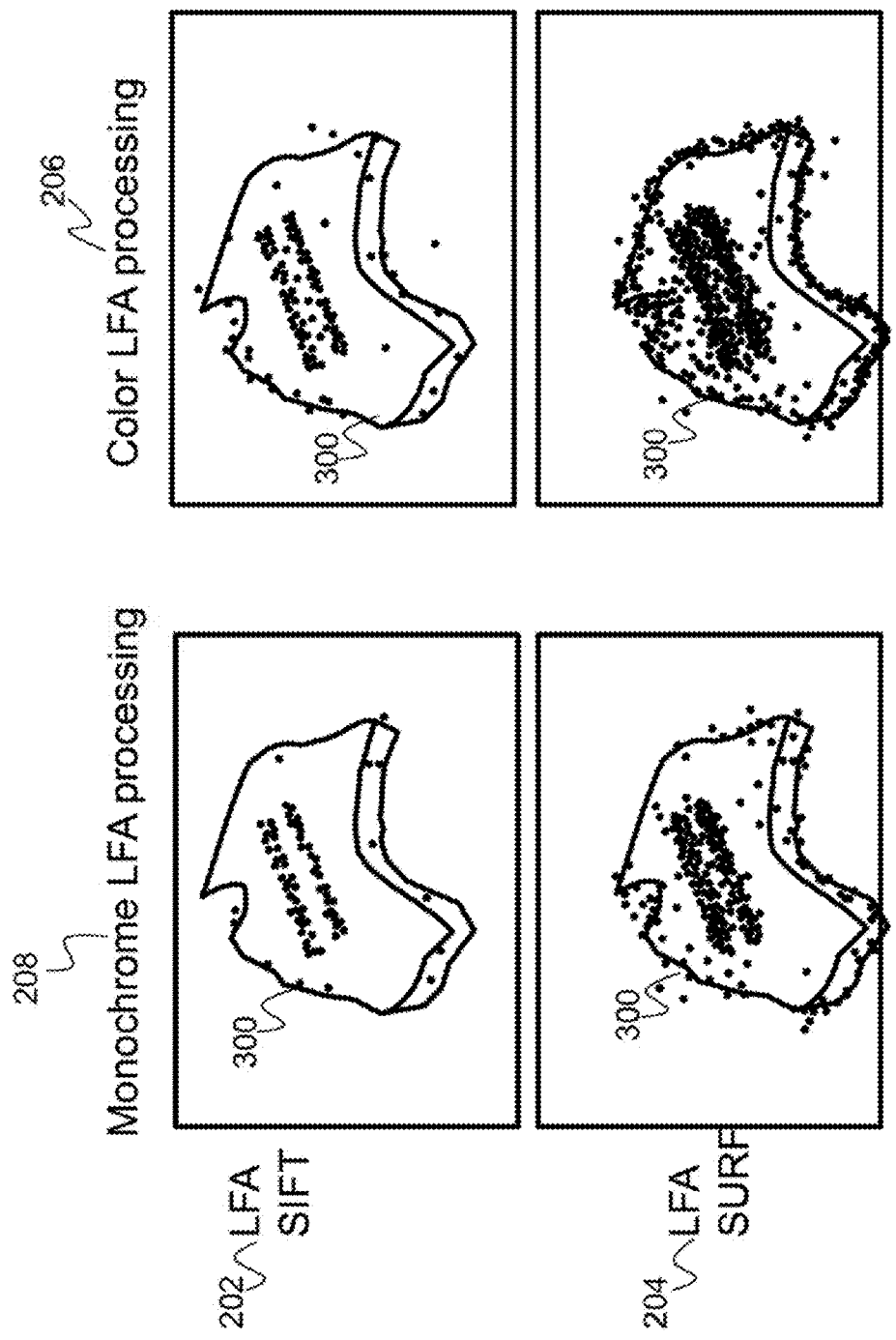
FIG. 3 is a set of images illustrating the difference in feature detection as a result of applying a local feature algorithm in color modes compared to a monochrome mode according to the present invention.
Figure 4:
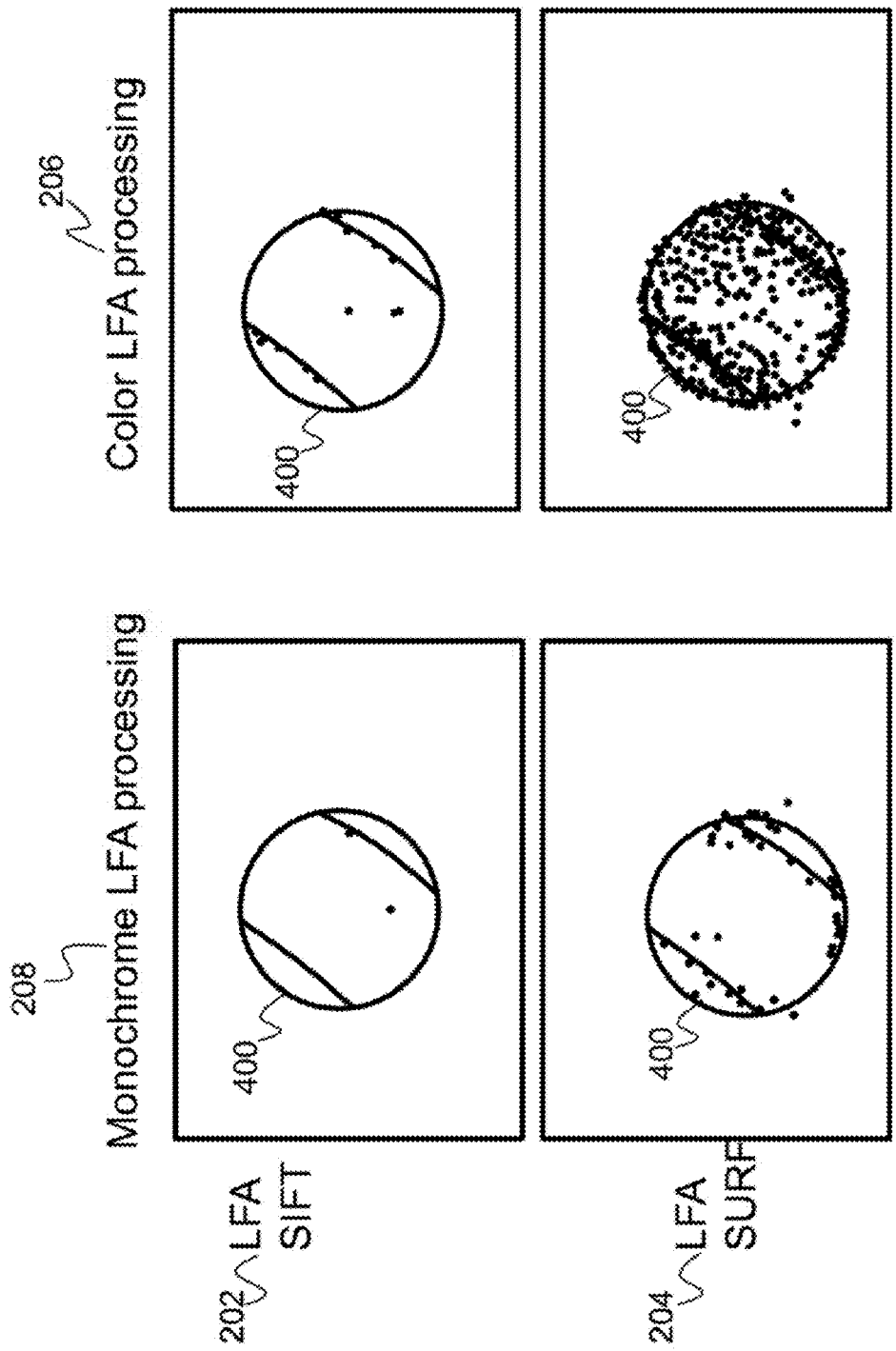
FIG. 4 is a set of images illustrating the difference in feature detection as a result of applying a local feature algorithm in color modes compared to a monochrome mode according to the present invention.

FIGS. 2, 3, and 4 depict examples of the increase in features that are detected as a result of computing features in all three channels and combining it using the equation above. The two most popular LFAs, SIFT and SURF, are compared in FIGS. 2, 3, and 4. FIG. 2 illustrates the difference in the number of features detected in an object (amplifier 200) as a result of applying a LFA (SIFT 202 and SURF 204) in all three color modes (color LFA processing 206) and combining the feature descriptors from all three modes as described above as compared to monochrome LFA processing 208. FIG. 3 depicts the difference in the number of features detected in an object 300 as a result of applying a LFA (SIFT 202 and SURF 204) in all three color modes (color LFA processing 206) compared to monochrome LFA processing 208. FIG. 4 exhibits the difference in the number of features detected in an object (ball 400) as a result of applying a LFA (SIFT 202 and SURF 204) in all three color modes (color LFA processing 206) compared to monochrome LFA processing 208.

A second part of the present invention is directed to removal of outliers, clustering using k-shared nearest neighbor, and segmentation. The second part, which will be described in detail below, was devised to overcome the difficulty in segmenting using a previous segmentation algorithm. Segmentation based on RANSAC (random sample consensus) as described in the Hess reference computed the best set of matched features to an object's pose, eliminated outliers, and computed the best transform that would take a boundary of the trained object to the current set of matched inliers. Segmentation based on RANSAC works well if the majority of the detected features belong to a certain pose and are unambiguously matched. Consider the ball 400 shown in FIG. 4. This is an example of a "texture-less" object. Because features on the ball 400 are not uniquely identified in any pose or within the same pose, features on this object cannot be uniquely matched to a single training feature in any pose using monochrome LFA processing. Since the transformation in the segmentation requires exact matches, the segmentation will fail.

Figure 5:
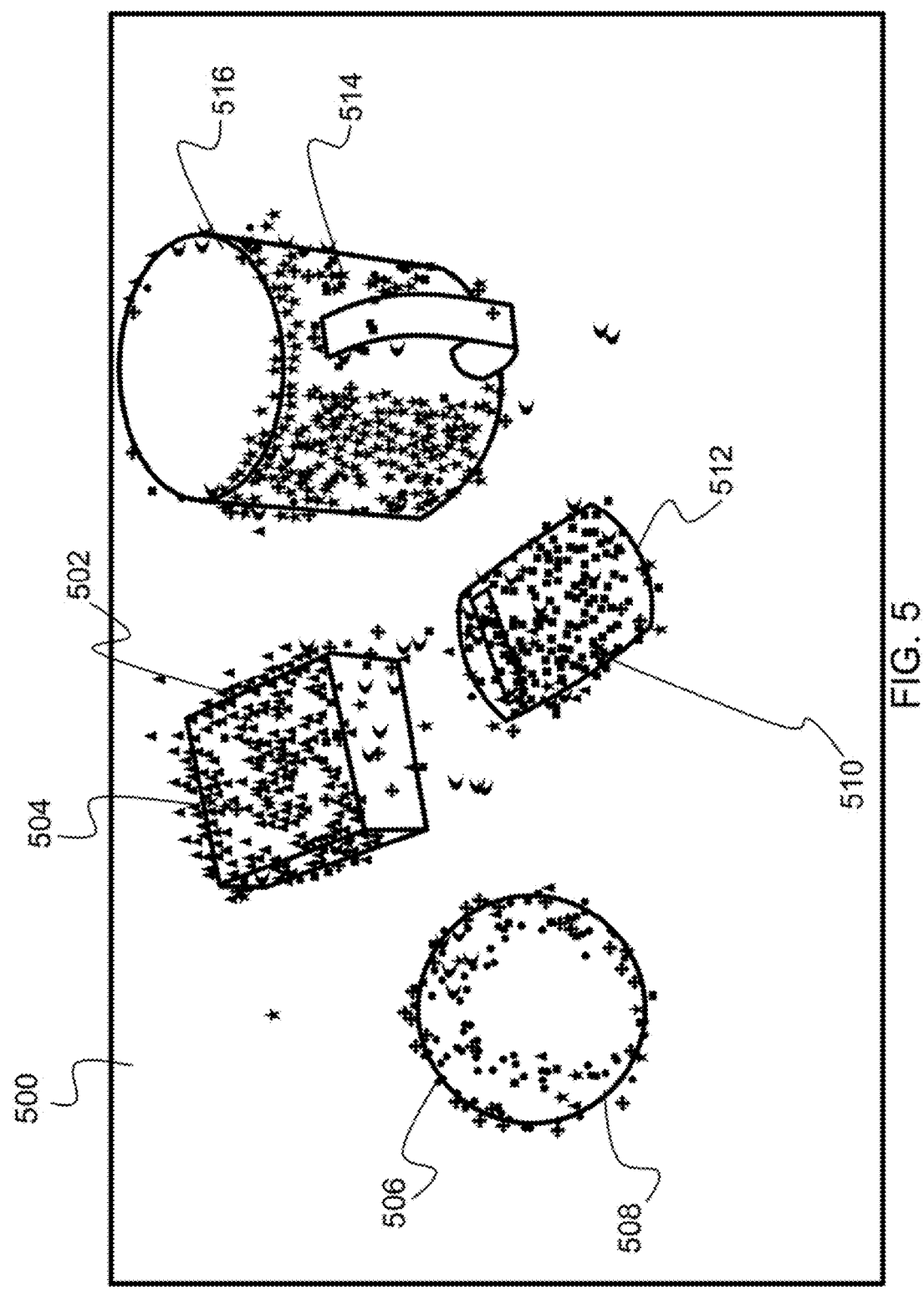
FIG. 5 is a set of images illustrating how features on objects are incorrectly assigned as belonging to a different object.

Features detected in test images are sometimes inaccurately classified to the wrong object. FIG. 5 is an example of how features on objects are incorrectly assigned as belonging to a different object. FIG. 5 is an image 500 of four objects that have been classified. Triangle 502 features correspond to object "amp" 504, circle 506 features correspond to object "ball" 508, square 510 features correspond to object "calculator" 512, and star 514 features correspond to object "cup" 516. One can observe there are several inaccurate assignments (i.e., outliers) on each of the objects (i.e., colored features that correspond to the incorrect objected). These outliers (incorrectly assigned points) have to be identified and discarded. This problem is solved by a simple algorithm that eliminates a feature if the majority of its nearest neighbors' object classes are different from its assigned class (i.e., a k-shared nearest neighbors algorithm).

An example of a suitable algorithm is as follows (where feature_list is list of all features in the test image):
1. For every feature$_i$ in feature_list,
   a. Create two lists of its 12 nearest neighbors; the first list (class1) contains the 12 nearest neighbors of the same class as feature$_i$; the second list (class2) consists of 12 nearest neighbors whose class is different from feature$_i$.
   b. Eliminate feature if more than 8 of its closest neighbors are from class2.
   End.
2. Repeat step 1 for every feature in the eliminated list with respect to the features that were not eliminated.

Figure 6A:
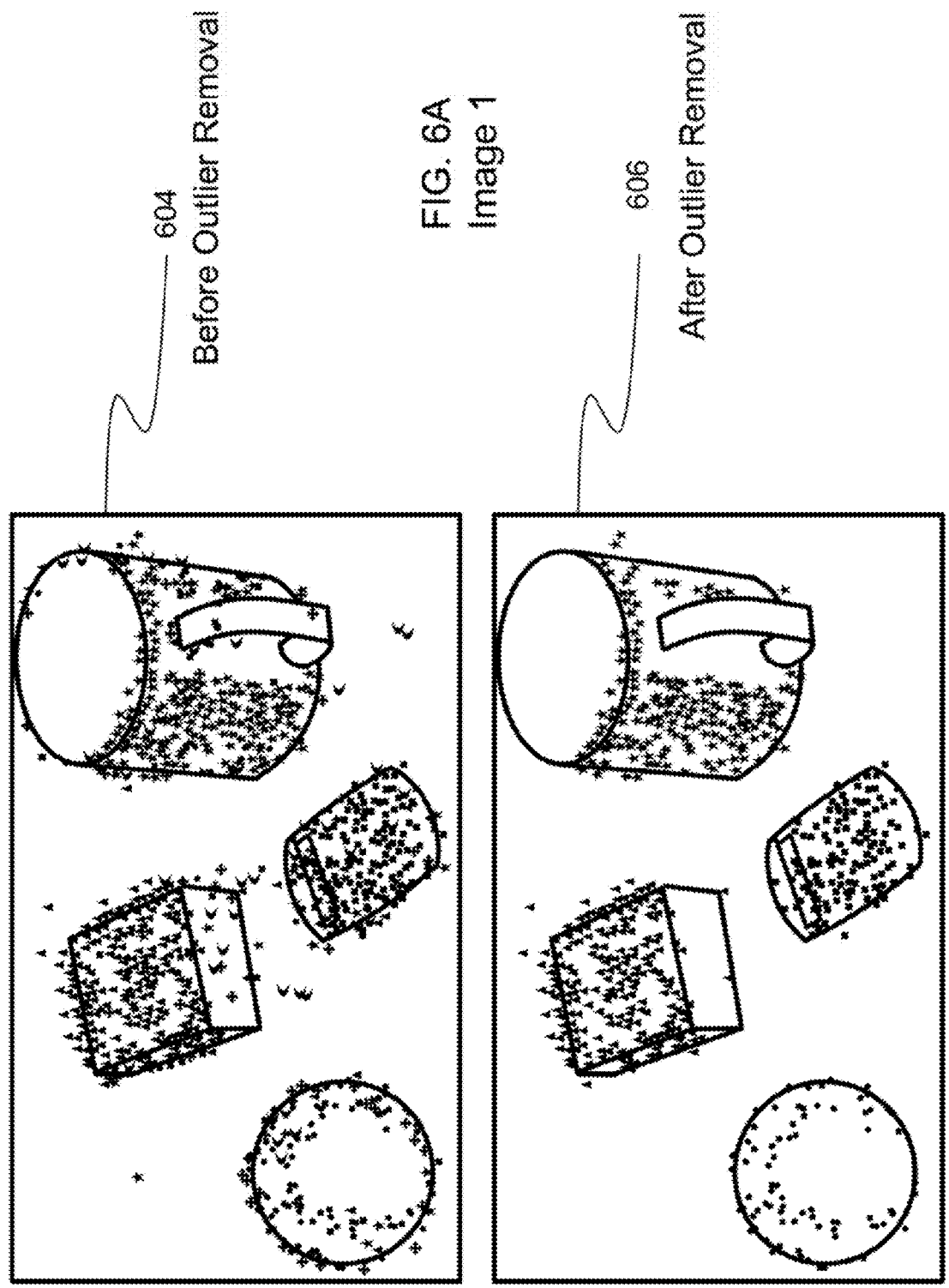
FIG. 6A is an image illustrating outlier removal according to the present invention.

FIGS. 6A and 6B present examples which illustrate the effectiveness of the outlier removal step. FIG. 6A shows Image 1 before 604 and after 606 outlier removal. Likewise, FIG. 6B depicts Image 2 before 604 outlier removal and after 606 outlier removal 606.

After the dataset is more or less free of outliers, groups of features are clustered in order to draw boundaries around objects. As a non-limiting example, the clustering is based on k-shared nearest neighbors as described by Jarvis and Patrick in "Clustering using a Similarity Measure based on Shared Nearest Neighbors" in IEEE Transactions on Computers, vol c-22, no. 11, November 1973 (hereinafter referred to as the Jarvis reference), which is hereby incorporated by reference as though fully set forth herein.

Next, each cluster is identified, and a boundary is drawn around the cluster using the convex hull of the cluster as described in *Computational Geometry in C* by Joseph O'Rourke, Cambridge University Press, 1994 (hereinafter referred to as the O'Rourke reference). Note that boundaries are drawn around each cluster, where each cluster consists of features all assigned to the same object. Pose is not considered.

Figure 7B:
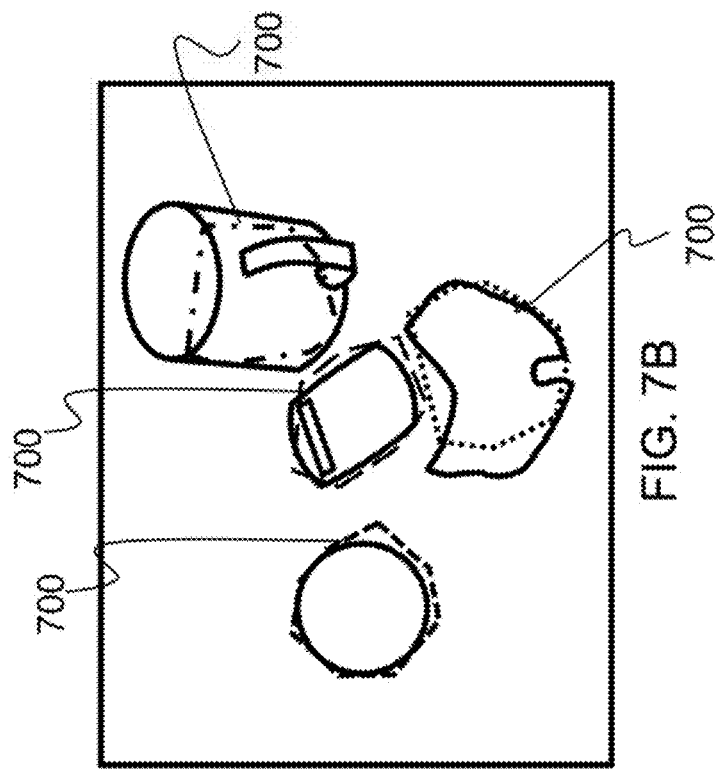
FIG. 7B is a set of images comparing prior art object recognition and object recognition according to the present invention, depicting an example where all four objects were properly recognized.
Figure 7A:
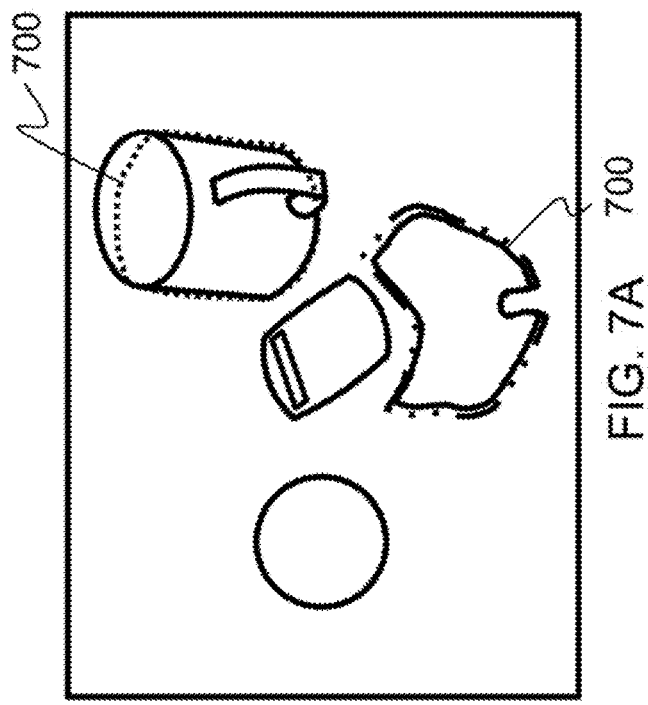
FIG. 7A is a set of images comparing prior art object recognition and object recognition according to the present invention, depicting an example where only two of the four objects were properly recognized.

FIGS. 7A and 7B are images representing examples of prior art object recognition and object recognition using the present invention, respectively. As shown in FIG. 7A, only two of the four objects were properly recognized, as evidenced by a drawn boundary 700 around an object. In contrast, and as shown in FIG. 7B, all four of the objects were properly recognized using the present invention, as evidenced by the drawn boundaries 700 around the objects.

The present invention has applications in areas such as surveillance, autonomous vehicles (both ground and air), intelligent robots of the future and other areas which require the core competence of recognizing three-dimensional objects in real-world scenarios.

(2.2) Foreground Extraction Through Segmentation and Nearest Neighbor Approaches This present invention describes a method for extraction of foreground objects and the correct rejection of the background from an image of a scene. The disclosed method allows for changes to the camera viewpoint or lighting between train and test time of the foreground extraction process. This feature makes it more flexible for real world computer vision and robotic applications. It is a supervised-learning algorithm, meaning that it has some knowledge of the foreground and background objects obtained during a training period ahead of experiment/test time. Furthermore, the present invention produces blobs of foreground objects that a recognition algorithm can then use for object detection/recognition.

As described above, the invention described herein is a supervised-learning algorithm with a separate training and testing stage. During the training stage, images of a set of objects that are considered "foreground objects" are collected. The images can be trained as all being in the same category or as separate objects. Then, a feature-detection algorithm, such as SIFT or SURF, is run on the training images of the foreground. In a desired aspect, the SURF feature detector is utilized in the present invention. If the images contain objects other than the training image (especially if the image may potentially contain features of the background), then the background is masked out so that the only features that are extracted from the image are the features of the foreground object.

During the testing stage, regions of a test image which are either lighter or darker than surrounding areas, also referred to as blobs, are extracted. The image is then segmented using the mean shift algorithm as described by Comaniciu et al. in "Mean Shift: A Robust Approach towards Feature Space Analysis" in IEEE Transactions on Pattern Analysis and Machine Intelligence, Vol. 24, No. 5, May 2002, which is hereby incorporated by reference as though fully set forth herein. In a desired aspect, the minimum segmentation region is set to be 200 pixels. Then, a feature detection algorithm (the same algorithm used for training) is run across the entire image. The class of each of the features detected in the test image is next assigned according to the class of its nearest neighbor in the training database. As a non-limiting example, a nearest neighbor match was used. However, as can be appreciated by one skilled in the art, one could also use a threshold defined in the SURF feature space. For every segment in the segmented image, the following is performed. If stereo data is available for the image, the median of the segment is calculated. If the median depth of that segment is beyond a predetermined threshold, then the pixels that are in that particular segment in the test image are set to zero. The ratio of foreground points to background points is then computed. If the ratio is greater than 0.5 (as a non-limiting example), then the segment is classified as foreground. Otherwise, the segment is classified as background, and the pixels in the segment in the test image are set to zero.

Figure 8:
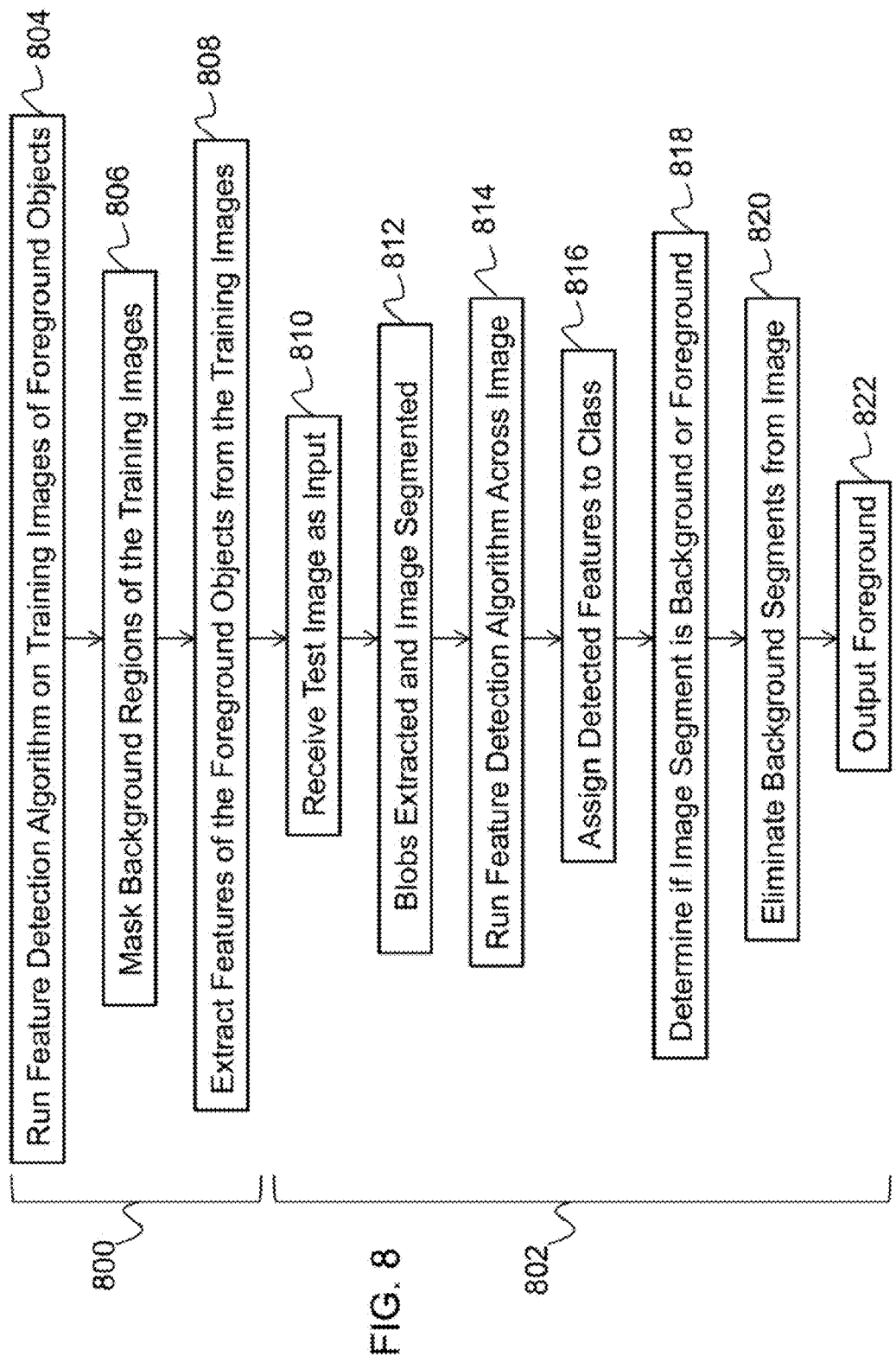
FIG. 8 is a flow diagram depicting a system for foreground extraction according to the present invention.

FIG. 8 is a flow diagram showing the method of foreground extraction, according to the present invention. As described above, the method is divided into a training stage 800 and a testing stage 802. During the training stage, the first step is to run a feature detection algorithm on training images of the foreground objects 804. Background regions of the training images are masked 806, and features from the foreground objects are then extracted 808, which marks the end of the training stage 800. During the testing stage 802, a test image is first received as input 810. Then, blobs are extracted, and the image is segmented 812, as described above. A feature detection algorithm is run across the image 814, and detected features are assigned to a class 816 (e.g., background, foreground). Next, for each image segment, it is determined if the image segment is background or foreground 818. Finally, background segments are eliminated from the image 820, and the foreground is output 822.

Figure 9E:
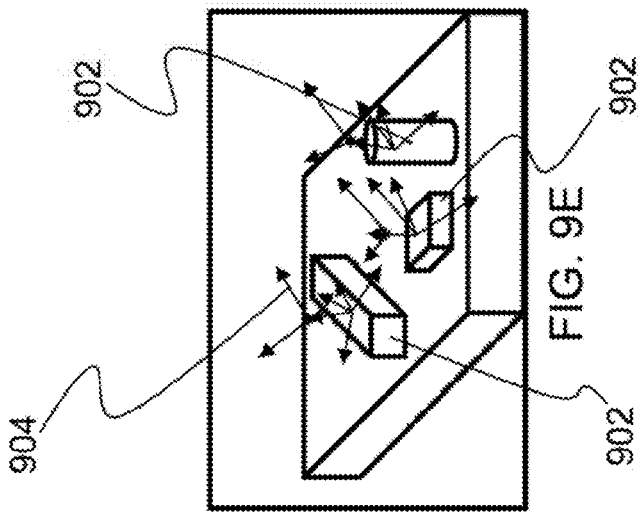
FIG. 9E is an image illustrating a result of recognizing foreground objects according to the present invention.
Figure 9B:
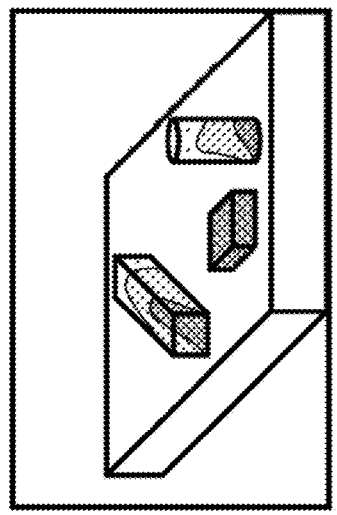
FIG. 9B is an image illustrating a result of running a segmentation algorithm on the test scene image according to the present invention.
Figure 9D:
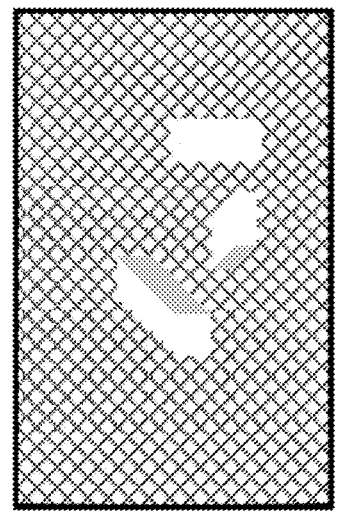
FIG. 9D is an image illustrating a result of deleting segments that were considered the background according to the present invention.
Figure 9A:
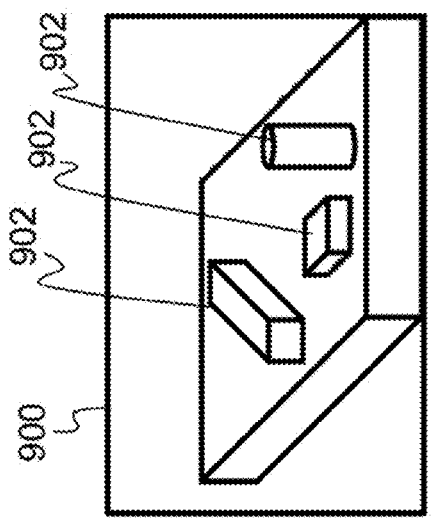
FIG. 9A is an image depicting a typical test scene image with objects according to the present invention.
Figure 9C:
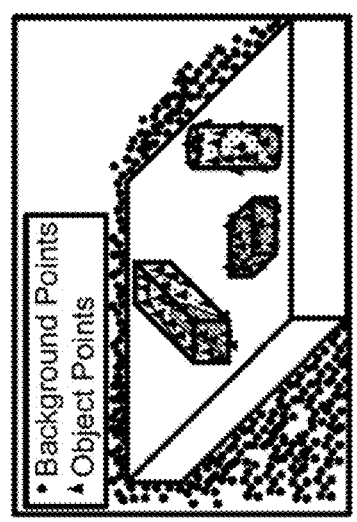
FIG. 9C is an image illustrating a result of running a feature detection algorithm on the test scene image according to the present invention.

FIGS. 9A-9E provide an example of the method of foreground extraction, according to the present invention, on an image of a scene taken from the same viewpoint as in the training phase. FIG. 9A is an illustration of an image 900 indicating a typical test scene with several objects 902. FIG. 9B is a result of running a segmentation algorithm on the image 900. In FIG. 9C, feature detection is run on the original image 900. After the feature detection scene, each segment from FIG. 9B is analyzed for whether it belongs to the foreground or background. If it is determined that a particular segment is part of the background, then it is eliminated. FIG. 9D is the result of deleting segments that were considered the background. FIG. 9E is the result of recognition of blobs from FIG. 9D. Arrows indicate grasp parameters. All objects 902 were correctly identified.

FIGS. 10A-10D also show the method of the present invention on an image of a scene taken from the same viewpoint as in the training phase. FIG. 10A is an illustration of a test image 1000 shown with objects 1002. FIG. 10B represents results of features detected super-imposed on the segmented image. If it is determined that a particular segment is part of the background, then it is eliminated. FIG. 10C is the result of deleting segments that were considered the background. FIG. 10D depicts the results of the recognition of blobs. All objects 1002 were correctly identified.

Figure 11B:
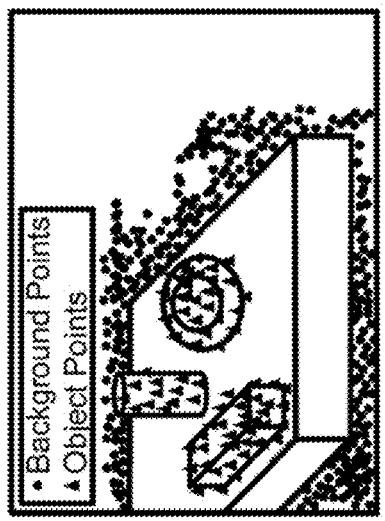
FIG. 11B is an image illustrating a result of features detected and super-imposed on the segmented image according to the present invention.
Figure 11D:
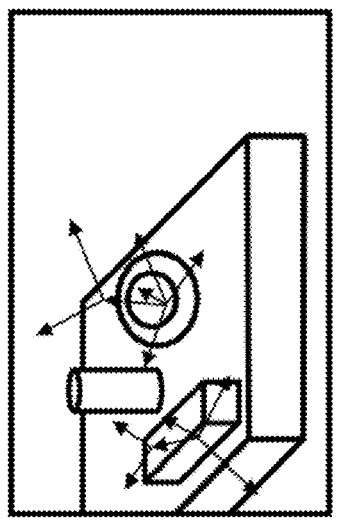
FIG. 11D is an image illustrating a result of recognizing foreground objects according to the present invention.
Figure 11A:
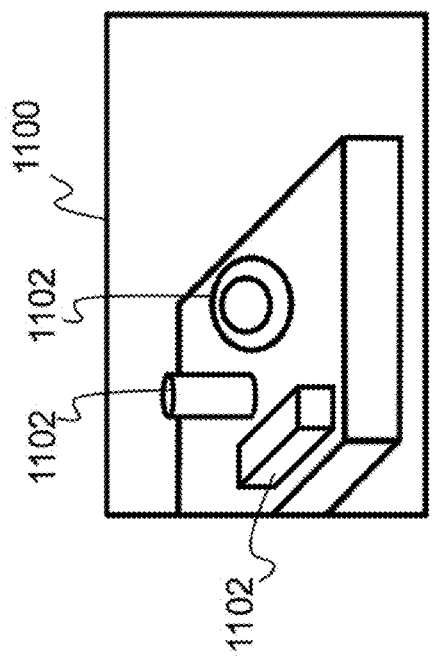
FIG. 11A is an image depicting a typical test scene image with objects, which was taken with a camera translated and rotated from the position used to take training images according to the present invention.
Figure 11C:
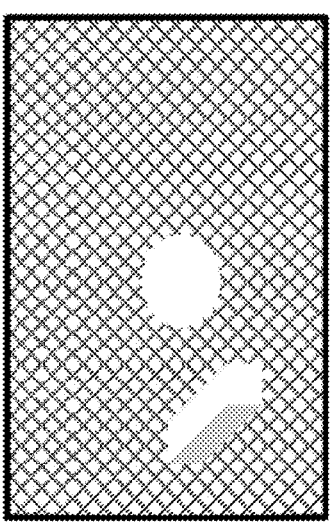
FIG. 11C is an image illustrating a result of deleting segments that were considered the background according to the present invention.

FIGS. 11A-11D illustrate the method of foreground extraction on an image taken from a different viewpoint from the training phase. FIG. 11A is an illustration of a test image 1100 shown with several objects 1102. The image 1100 was taken with a camera translated and rotated from the position used to take the training images. FIG. 11B represents results of features detected super-imposed on the segmented image. If it is determined that a particular segment is part of the background, then it is eliminated. FIG. 11C is the result of deleting segments that were determined as background. FIG. 11D depicts results of the recognition of blobs.

Figure 12A:
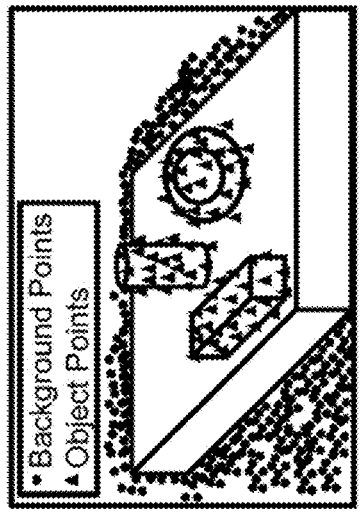
FIG. 12A is an image depicting a typical test scene image with objects, which was taken with a different light condition than what was used when training images were taken according to the present invention.
Figure 12B:
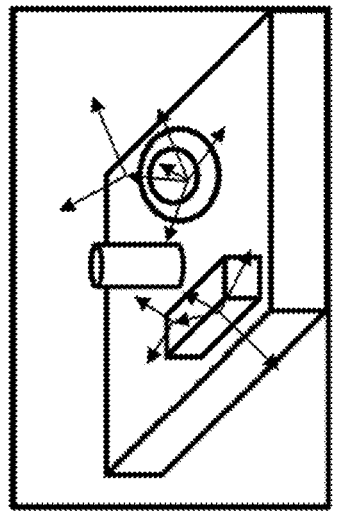
FIG. 12B is an image illustrating a result of features detected and super-imposed on the segmented image according to the present invention.
Figure 12C:
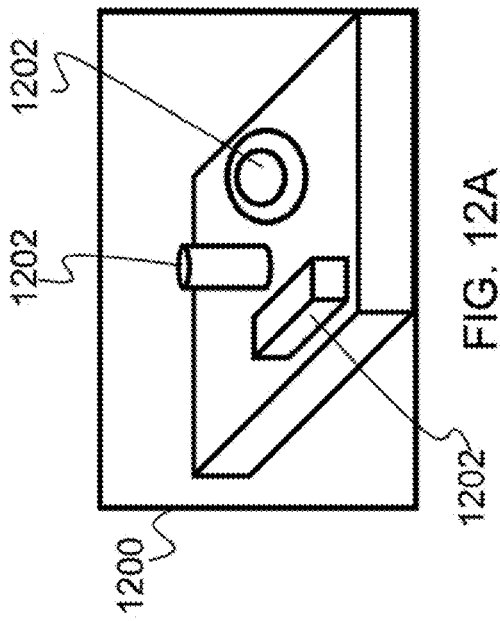
FIG. 12C is an image illustrating a result of deleting segments that were considered the background according to the present invention.
Figure 12D:
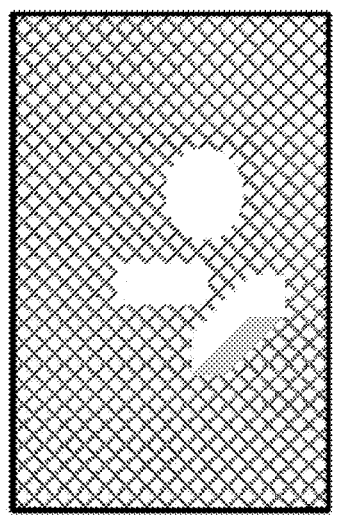
FIG. 12D is an image illustrating a result of recognizing foreground objects according to the present invention.

FIGS. 12A-12D depict the method using an image taken from a different lighting condition than what was used in training. FIG. 12A is an illustration of a test image 1200 shown with objects 1202. FIG. 12B depict results of features detected super-imposed on the segmented image. If it is determined that a particular segment is part of the background, then it is eliminated. FIG. 12C represents the result of deleting segments that were determined as background. FIG. 12D depicts the results of the recognition of blobs (all correctly identified).

The applications of the present invention are wide and varied. Since elimination of background is such a core technology that is utilized in most computer vision applications, it can be leveraged in most situations where computer vision is employed. As noted above, the invention has many applications in areas such as surveillance, autonomous vehicles (both ground and air), intelligent robots of the future and other areas which require the core competence of recognizing 3D objects in real-world scenarios.

Figure 13:
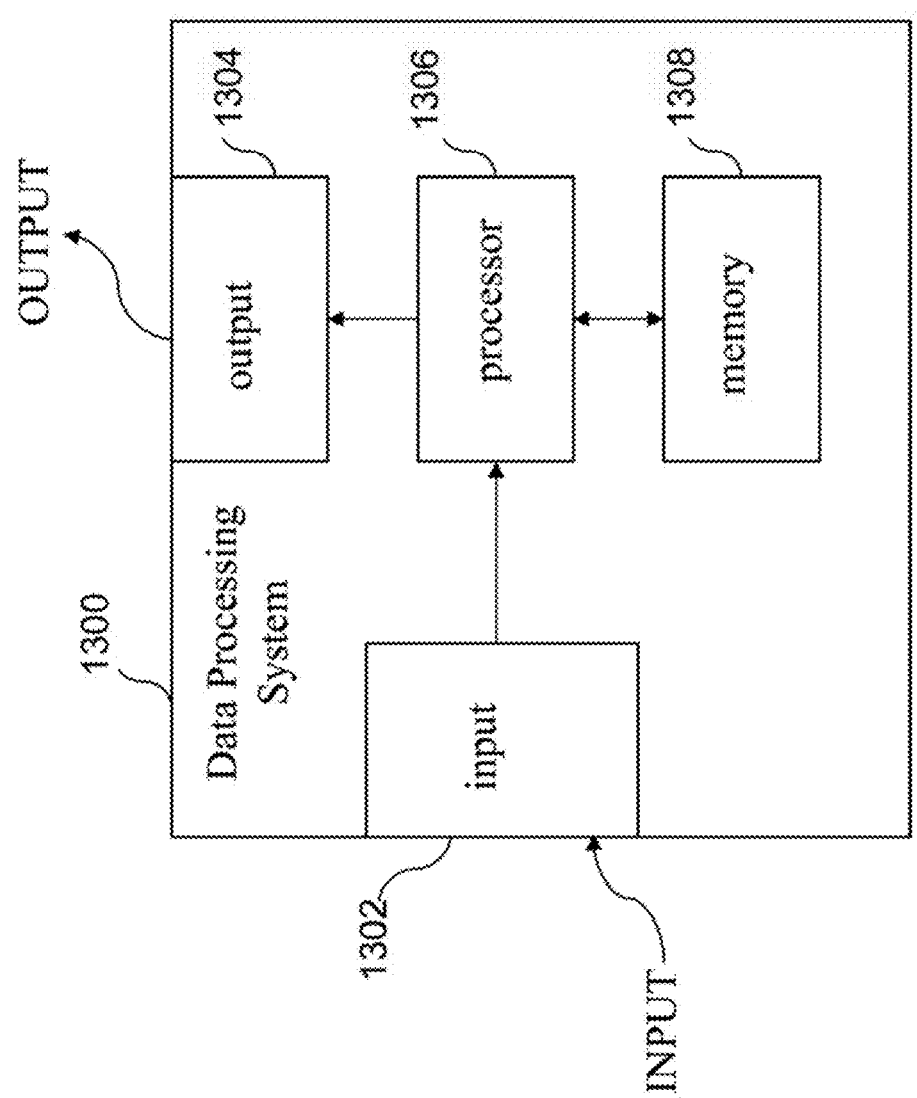
FIG. 13 is an illustration of a data processing system according to the present invention.

FIG. 13 illustrates a block diagram depicting components of a data processing system 1300 (e.g., computer) incorporating the operations of the method described above and throughout the specification. The method utilizes a data processing system 1300 for storing computer executable instructions (or instruction means) for causing a processor to carry out the operations of the above described method. The data processing system 1300 comprises an input 1302 for receiving information from a user. Information received may include input from devices such as cameras, scanners, keypads, keyboards, microphone, other peripherals such as storage devices, other programs, etc. The input 1302 may include multiple "ports." An output 1304 is connected with a processor 1306 (or processors) for providing information for transmission to other data processing systems, to storage devices, to display devices such as monitors, to generating information necessary for delivery, and to other mechanisms for presentation in user-usable forms. The input 1302 and the output 1304 are both coupled with the processor 1306, which may be a general-purpose computer processor or a specialized processor designed specifically for use with the present invention. The processor 1306 is coupled with a memory 1308 to permit storage of data and software to be manipulated by commands to the processor 1306.

Figure 14:
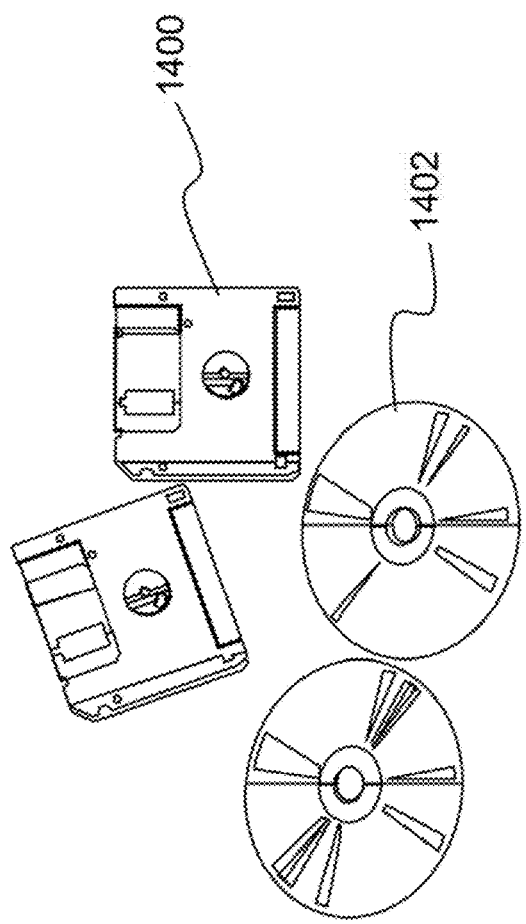
FIG. 14 is an illustration of a computer program product according to the present invention.

An illustrative diagram of a computer program product embodying the present invention is depicted in FIG. 14. As a non-limiting example, the computer program product is depicted as either a floppy disk 1400 or an optical disk 1402. However, as mentioned previously, the computer program product generally represents computer readable code (i.e., instruction means or instructions) stored on any compatible non-transitory computer readable medium.

What is claimed is:

1. A system for object recognition, the system comprising: one or more processors and a memory having instructions such that when the instructions are executed, the one or more processors perform operations of:
   in a training phase, extracting a set of features from a set of foreground training images of foreground objects captured in a first lighting condition with a camera having a first viewpoint using a feature detection algorithm, resulting in a set of foreground features;
   in a testing phase, extracting at least one region of interest from an input image, wherein the at least one region of interest represents a potential foreground object, wherein at least one of the following applies to the input image: the input image is captured in a second lighting condition that is different from the first lighting condition, and the input image has a second viewpoint that is different from the first viewpoint:
   segmenting the input image, resulting in a set of segments;
   processing the input image with a feature detection algorithm to detect a set of features, resulting in a set of detected features;
   assigning each feature in the set of detected features to a class, resulting in as set of assigned features;

classifying each segment in the set of segments as representing foreground or background based on the assigned features in each segment; and outputting the segments representing a foreground object in the input image.

2. The system for object recognition as set forth in claim 1, wherein the system is further configured to perform operations of:

collecting images representing background that are expected to be seen if the camera moves, resulting in a set of background training images; and processing the background training images with a feature detection algorithm, resulting in a set of background features.

3. The system for object recognition as set forth in claim 2, wherein the system is further configured to perform an operation of masking any background regions from the set of training images such that only features representing foreground objects are extracted.

4. The system for object recognition as set forth in claim 3, wherein the system is further configured to perform an operation of eliminating any segments representing background in the input image.

5. The system for object recognition as set forth in claim 4, wherein the system is further configured to perform an operation of assigning the class of each feature in the set of detected features according to a class of its nearest neighbor in either the set of background features or the set of foreground features.

* * * * *